(12) United States Patent
Gruber et al.

(10) Patent No.: US 12,109,746 B2
(45) Date of Patent: Oct. 8, 2024

(54) METHOD FOR MANUFACTURING AN IMPELLER

(71) Applicant: ebm-papst Mulfingen GmbH & Co. KG, Mulfingen (DE)

(72) Inventors: Erhard Gruber, Satteldorf (DE); Martin Kleinschrodt, Creglingen (DE); Lili Zhao, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 17/498,801

(22) Filed: Oct. 12, 2021

(65) Prior Publication Data

US 2022/0118663 A1    Apr. 21, 2022

(30) Foreign Application Priority Data

Oct. 15, 2020  (DE) .................... 10 2020 127 199.9

(51) Int. Cl.
| | | |
|---|---|---|
| *B29C 45/22* | (2006.01) | |
| *B29C 45/00* | (2006.01) | |
| *B29C 45/23* | (2006.01) | |
| *B29C 45/27* | (2006.01) | |
| *B29K 101/12* | (2006.01) | |
| *B29L 31/08* | (2006.01) | |
| *F04D 29/22* | (2006.01) | |

(52) U.S. Cl.
CPC .......... *B29C 45/22* (2013.01); *B29C 45/0005* (2013.01); *B29C 45/231* (2013.01); *B29C 2045/279* (2013.01); *B29K 2101/12* (2013.01); *B29L 2031/08* (2013.01); *F04D 29/2222* (2013.01)

(58) Field of Classification Search
CPC .. B29C 45/22; B29C 45/231; B29C 2045/279
See application file for complete search history.

(56) References Cited

U.S. PATENT DOCUMENTS

| | | | |
|---|---|---|---|
| 2005/0123712 A1* | 6/2005 | Kammler | F04D 29/023 |
| | | | 428/66.1 |
| 2006/0290030 A1* | 12/2006 | Tamaki | B29C 45/33 |
| | | | 264/328.7 |
| 2007/0104581 A1 | 5/2007 | Stagg et al. | |

(Continued)

FOREIGN PATENT DOCUMENTS

| | | | |
|---|---|---|---|
| DE | 102016207545 A1 | 11/2017 | |
| JP | 2003-094494 A | 4/2003 | |
| WO | WO-2019048273 A1 * | 3/2019 | ......... B29C 45/0025 |

OTHER PUBLICATIONS

Extended European Search Report dated Feb. 9, 2022 in corresponding European Application No. 21196052.1.

*Primary Examiner* — Alison L Hindenlang
*Assistant Examiner* — Virak Nguon
(74) *Attorney, Agent, or Firm* — Harness, Dickey & Pierce, P.L.C.

(57) ABSTRACT

A method for manufacturing an impeller with a number of impeller blades and a cover disc covering the impeller blades. Plastic is injected into an injection mold using a cascade injection molding process to form the impeller. The injection mold has a number of shut-off nozzles to feed the plastic at various joint positions and different opening times. The number of shut-off nozzles is determined as a function of the number of impeller blades.

11 Claims, 2 Drawing Sheets

(56) References Cited

U.S. PATENT DOCUMENTS

| | | | |
|---|---|---|---|
| 2008/0232970 A1* | 9/2008 | Cheng et al. | F04D 29/281 416/223 R |
| 2010/0225025 A1* | 9/2010 | Striegel | B29C 45/281 264/328.8 |

* cited by examiner

METHOD FOR MANUFACTURING AN IMPELLER

CROSS-REFERENCE TO RELATED APPLICATION

This application claims priority to German Patent Application No. 10 2020 127 199.9 filed Oct. 15, 2020. The entire disclosure of the above application is incorporated herein by reference.

FIELD

The disclosure relates to a method for manufacturing an impeller.

BACKGROUND

Impellers made of plastic that are produced by injection molding are known from the prior art. Such plastic injection-molded components require a high level of quality in order to ensure the necessary strength for high speeds and the associated centrifugal forces. The impellers have critical regions that tend to crack when subjected to stress. One such critical region is located above all in the cover disc covering the impeller blade.

Manufacturing using injection molding processes results in the creation of joint lines at the plastic flow fronts. Thus, the risk of cracking is particularly high in the vicinity of the joint lines. It is therefore of fundamental importance to place the joint lines in a region with as little stress as possible. The standardized and compulsory joint configuration of the injection molding process and the number of joints required results in a corresponding number of joint lines on the cover plate. The possibility of placing these joint lines in low-stress regions is therefore severely limited.

It is therefore an object of the disclosure to provide a method for manufacturing an impeller using a plastic injection molding process where the tendency to crack in the vicinity of the joint lines is reduced.

SUMMARY

This object is achieved by a method for manufacturing an impeller with a number of impeller blades and a cover disc covering the impeller blades. The impeller blades is injected molder from plastic into an injection mold using a cascade injection molding process. The plastic is fed into the injection mold via a number of shut-off nozzles at different joint positions with different opening times. The number of shut-off nozzles is determined as a function of the number of impeller blades.

According to the disclosure, a method for manufacturing an impeller with a number of impeller blades and a cover disc covering the impeller blades is proposed. The impeller is injected from plastic into an injection mold using a cascade injection molding method. For this purpose, the injection mold comprises a number of shut-off nozzles, particularly needle valve nozzles, to feed the plastic in at different joint positions having different opening times in order to carrying out the cascade injection molding process. According to the disclosure, the number of shut-off nozzles is determined as a function of the number of impeller blades.

The cascade injection molding process is known to those skilled in the art. It is a form of sequential injection molding where a plurality of shut-off nozzles are used. This makes it possible to fill the plastic molded part over a plurality of gates. It is also known to use a hot runner system for the cascade injection molding process. This maintains the plastic molding compound in liquid form.

As a matter of principle, in the cascade injection molding process, filling the injection mold cavity, is especially advantageous when given that the opening times of the shut-off nozzles can be set individually, via a control. The injection of the plastic into the cavity of the injection mold initially only takes place via certain shut-off nozzles. The resulting melt front flows and reaches the downstream shut-off nozzle(s) that are only opened then. The shut-off nozzles are thus opened successively in a cascade-like manner. The plastic melt now flows into the cavity through the shut-off nozzles that are opened successively. On the one hand, the cascade technology reduces the number of joint lines. On the other hand, the joint lines can be flown through by the shut-off nozzles that are opened later. Thus, the joint lines can even be completely eliminated or at least substantially improved in quality.

The cascade injection molding process for manufacturing the impeller is carried out in order to reduce or eliminate the joint lines in regions on the cover disc that are critical with regard to strength. The number of shut-off nozzles is determined as a function of the number of impeller blades that are attached to the cover plate. Thus, the melt front of the plastic injected, via the shut-off nozzles, flows over the joints between the cover plate and the impeller blades. Accordingly, due to the different opening times of the shut-off nozzles in the cascade injection molding process, no joint lines are formed on the cover disc. This increases the strength and reduces the tendency to cracking due to weak points.

In one embodiment, it is advantageous where the various joint positions are correlated with the cover plate. In particular, it is favorable if the various joint positions are correlated with the cover disc, in such a way that, when viewed in an axial projection, the joint positions of the cover disc each lie between the impeller blades in the circumferential direction. When viewed along the axis of rotation of the impeller, the cover disc and the impeller blades are axially in contact with one another. The impeller blades can extend in a straight line or with a forward or rearward curvature in the circumferential direction. However, the joint positions are preferably established in such a way that they do not extend on, but rather at a distance from, a connecting line between the cover disc and the impeller blades.

In one embodiment of the method, given an even number of impeller blades, the number of shut-off nozzles corresponds to the number of impeller blades. For example, in the case of six impeller blades arranged in the circumferential direction on the impeller, six shut-off nozzles are respectively provided at the same distance in the circumferential direction. This ensures that the shut-off nozzles eliminate all joint lines through their different opening times.

If the number of impeller blades is odd, the number of shut-off nozzles is greater than the number of impeller blades. In particular, given an odd number of impeller blades, the number of shut-off nozzles is twice that of the impeller blades. For example, in the case of five impeller blades arranged in the circumferential direction on the impeller, ten shut-off nozzles are respectively provided at the same distance in the circumferential direction. This makes it possible for complete throughput to be achieved with time-staggered opening of the shut-off nozzles. Hence, all joint lines are eliminated.

A plurality of the shut-off nozzles are each divided into cascade groups. The cascade groups have successive shut-off nozzle opening times. Through the assignment into cascade groups, the opening times of the shut-off nozzles can be controlled in groups, via a controller. In the case of an impeller with six impeller blades, for example, three of six shut-off nozzles first open at the same time. This is followed by the other three shut-off nozzles opening, after a specified temporal offset, in order to inject plastic into the melt front of the plastic from the first-opened shut-off nozzles and eliminate the joint lines.

In particular, one embodiment is advantageous where the shut-off nozzles of one of the cascade groups are positioned exactly where joint lines of the plastic, fed from the shut-off nozzles of another cascade group, are located. The arrangement of the cascade group of shut-off nozzles is therefore precisely coordinated with the corresponding impeller and the respective number of impeller blades.

The method relates particularly to a radial impeller. A fiber-reinforced plastic is preferably used as the plastic.

In addition, the disclosure comprises an impeller that is manufactured according to the method described above with an optional bottom disc, impeller blades, and the cover disc.

Further areas of applicability will become apparent from the description provided herein. The description and specific examples in this summary are intended for purposes of illustration only and are not intended to limit the scope of the present disclosure.

DRAWINGS

Other advantageous refinements of the disclosure are depicted in greater detail below together with the description of the preferred embodiment of the disclosure with reference to the figures.

DETAILED DESCRIPTION

Figure 1:
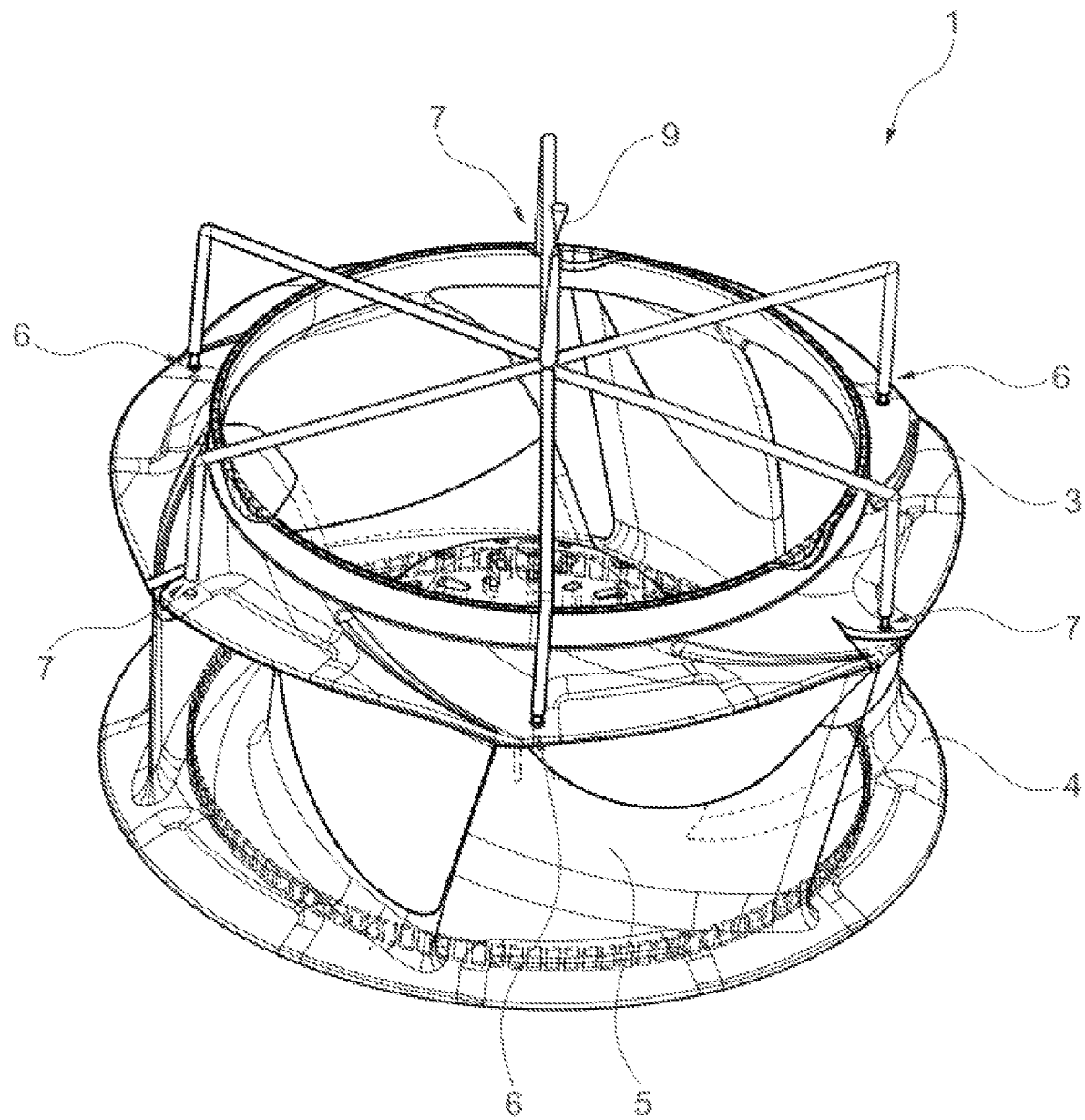
FIG. 1 is a perspective view of an impeller according to a first design variant.

FIG. 1 shows a perspective view of an impeller 1 in a first design variant. It includes a bottom disc 4, a cover disc 3, and impeller blades 5, formed axially therebetween. This exemplary embodiment relates to an impeller 1 that is embodied as a radial fan with six impeller blades 5. Even though a bottom disc 4 is shown in FIG. 1, impellers without a bottom disc can also be produced.

The impeller 1 is manufactured from thermoplastic material using the method described in the injection mold using a cascade injection molding process. The impeller 1, with six impeller blades 5, includes six needle valve nozzles 6, 7 provided as joint positions to feed the plastic. Preferably, it is a hot runner system. The feed 9 is provided at joint positions that are equally spaced apart in the circumferential direction, via which the plastic is injected into the cavity of the injection mold.

The joint positions of the needle valve nozzles 6, 7 are correlated with the cover disc 3. This means that the liquid plastic is introduced into the region that forms the cover disc 3. When viewed in the circumferential direction, the joint positions of the needle valve nozzles 6, 7 are located between the impeller blades 5. They are adjacent to and not on the connecting lines of the impeller blades 5 and the cover disc 3, when viewed in an axial projection. During the manufacture of the impeller 1, the liquid plastic flows in the circumferential direction over the region of the cover disc 3. This represents the connecting lines of the impeller blades 5 and the cover disc 3.

The needle valve nozzles 6, 7 are divided into two cascade groups. The needle valve nozzles 6, provided with reference numeral 6, form the first group. The needle valve nozzles 7, provided with the reference numeral 7, form the second group. Both cascade groups of the needle valve nozzles 6, 7 have successive opening times. Thus, the melt front of liquid plastic from the needle valve nozzles 6, of the first cascade group, respectively, travels past the needle valve nozzles 7 of the second cascade group, when the needle valve nozzles 7 of the second cascade group are opened. The needle valve nozzles 7 of the second cascade group are positioned exactly where the joint lines of the plastic fed from the needle valve nozzles 6 of the first cascade group are located.

Figure 2:
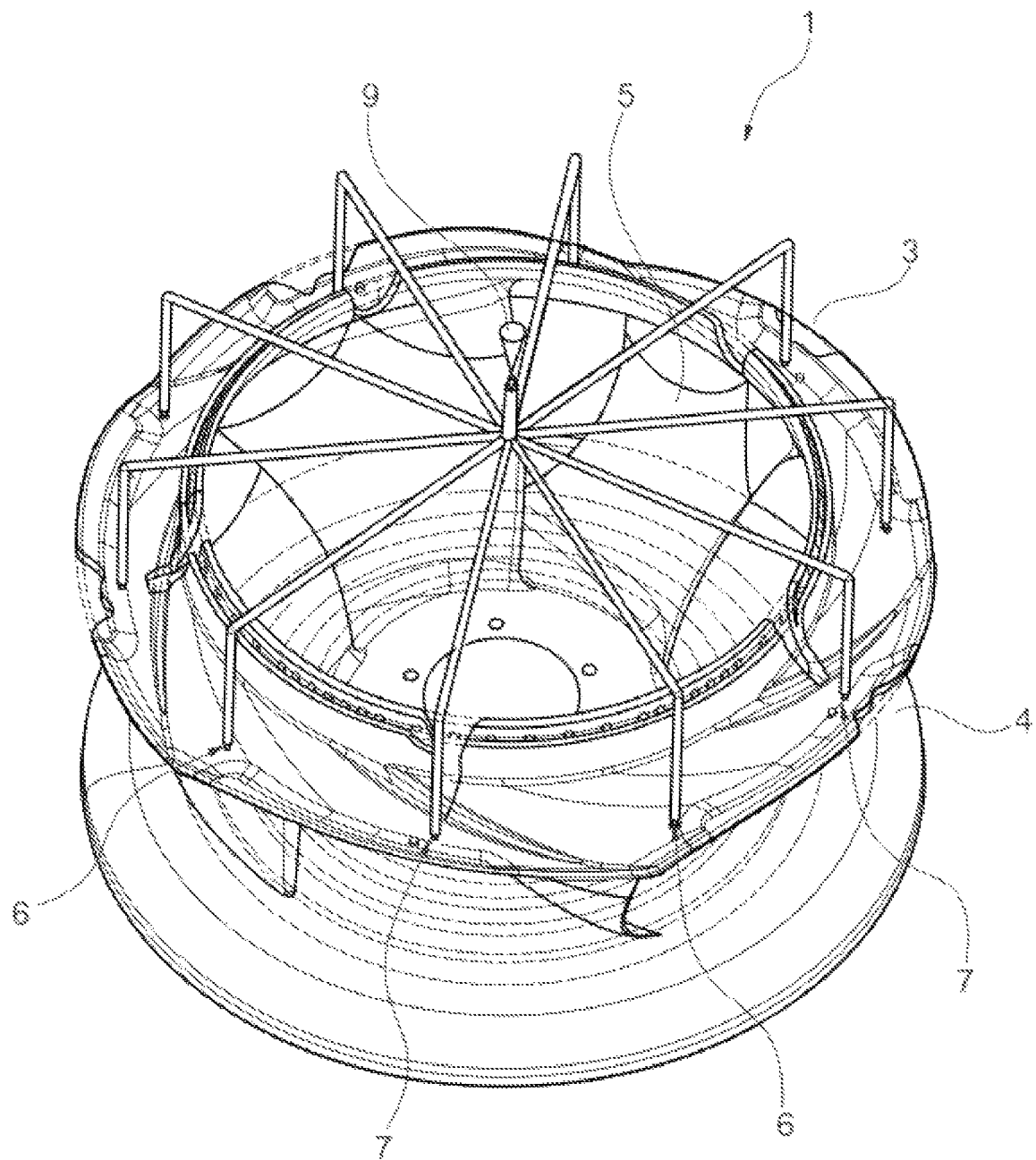
FIG. 2 is a perspective view of an impeller according to a second design variant.

FIG. 2 shows an alternative exemplary embodiment of an impeller 1. The features of the embodiment from FIG. 1 are substantially identical, but the number of impeller blades 5 and joint positions with the needle valve nozzles 6, 7 varies. The impeller 1 does not have six, but only five impeller blades 5, an odd number. In order to eliminate the formation of joint lines in the same way as in the embodiment according to FIG. 1, the number of joints and needle valve nozzles 6, 7 is twice that of the impeller blades of FIG. 1. Here, the plastic is injected in temporal succession between the impeller blades 5 through cascade injection, via two cascade groups. The groups are composed of the needle valve nozzles 6 and the needle valve nozzles 7, thereby eliminating the joint lines.

The disclosure is not limited in its execution to the abovementioned preferred exemplary embodiments. Rather, a number of variants are conceivable that make use of the illustrated solution even in the form of fundamentally different embodiments. For example, the method can also be applied to axial fan impellers with and without a bottom disc. Fiber-reinforced thermoplastics can also be preferably used as plastics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing an impeller with a number of impeller blades and a cover disc covering the impeller blades comprising:
    injection-molding the impeller blades from plastic into an injection mold using a cascade injection molding process;
    feeding the plastic into the injection mold via a number of shut-off nozzles at different positions only along a circumference of the injection mold with different opening times such that the plastic enters the injection mold in an axial direction with respect to an axis of the impeller blades; and
    determining the number of shut-off nozzles as a function of the number of impeller blades wherein when the number of impeller blades is even the number of shut-off nozzles and impeller blades is always the same and when the number of impeller blades is odd there are always more shut-off nozzles than impeller blades.

2. The method as set forth in claim 1, further comprising correlating various positions with the cover disc.

3. The method as set forth in claim 2, further comprising correlating the various positions of the cover disc in such a way that, when viewed in a projection, the positions of the cover disc are each located between adjacent impeller blades.

4. The method as set forth in claim 1, wherein the number of impeller blades is even and the number of shut-off nozzles corresponds to the number of impeller blades.

5. The method as set forth in claim 1, wherein the number of impeller blades is odd and the number of shut-off nozzles is greater than the number of impeller blades.

6. The method as set forth in claim 1, wherein if the number of impeller blades is odd, the number of shut-off nozzles is twice that of the impeller blades.

7. The method as set forth in claim 1, wherein a plurality of the shut-off nozzles are respectively divided into cascade groups, and the cascade groups have successive shut-off nozzle opening times.

8. The method as set forth in claim 7, further comprising positioning the shut-off nozzles of one of the cascade groups where the joint lines of the plastic fed from the shut-off nozzles of another cascade group are located.

9. The method as set forth in claim 1, wherein the impeller is a radial impeller.

10. The method as set forth in claim 1, wherein the plastic is a fiber-reinforced plastic.

11. An impeller manufactured according to the method as set forth in claim 1.

* * * * *